Patented Apr. 9, 1929.

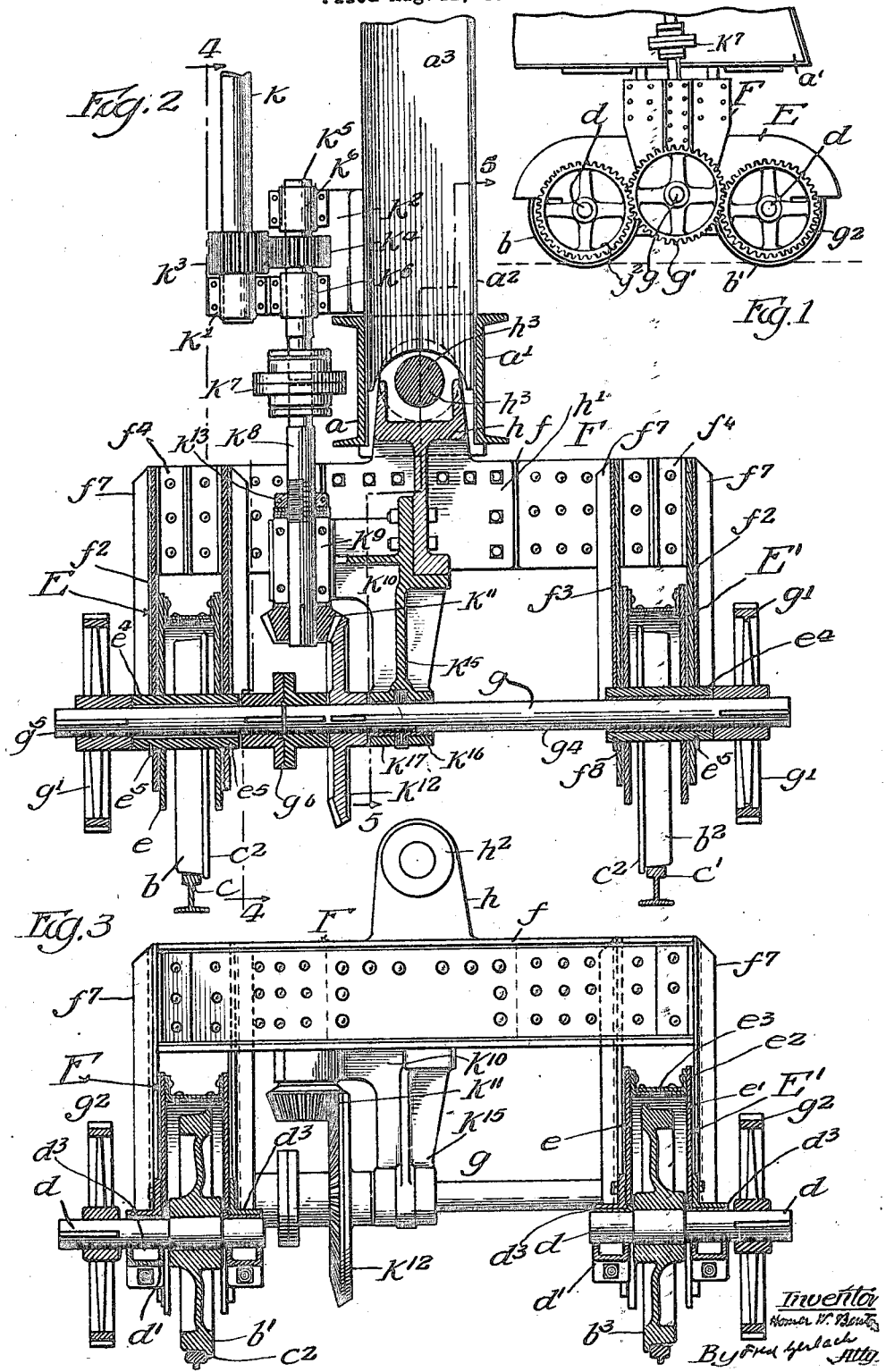

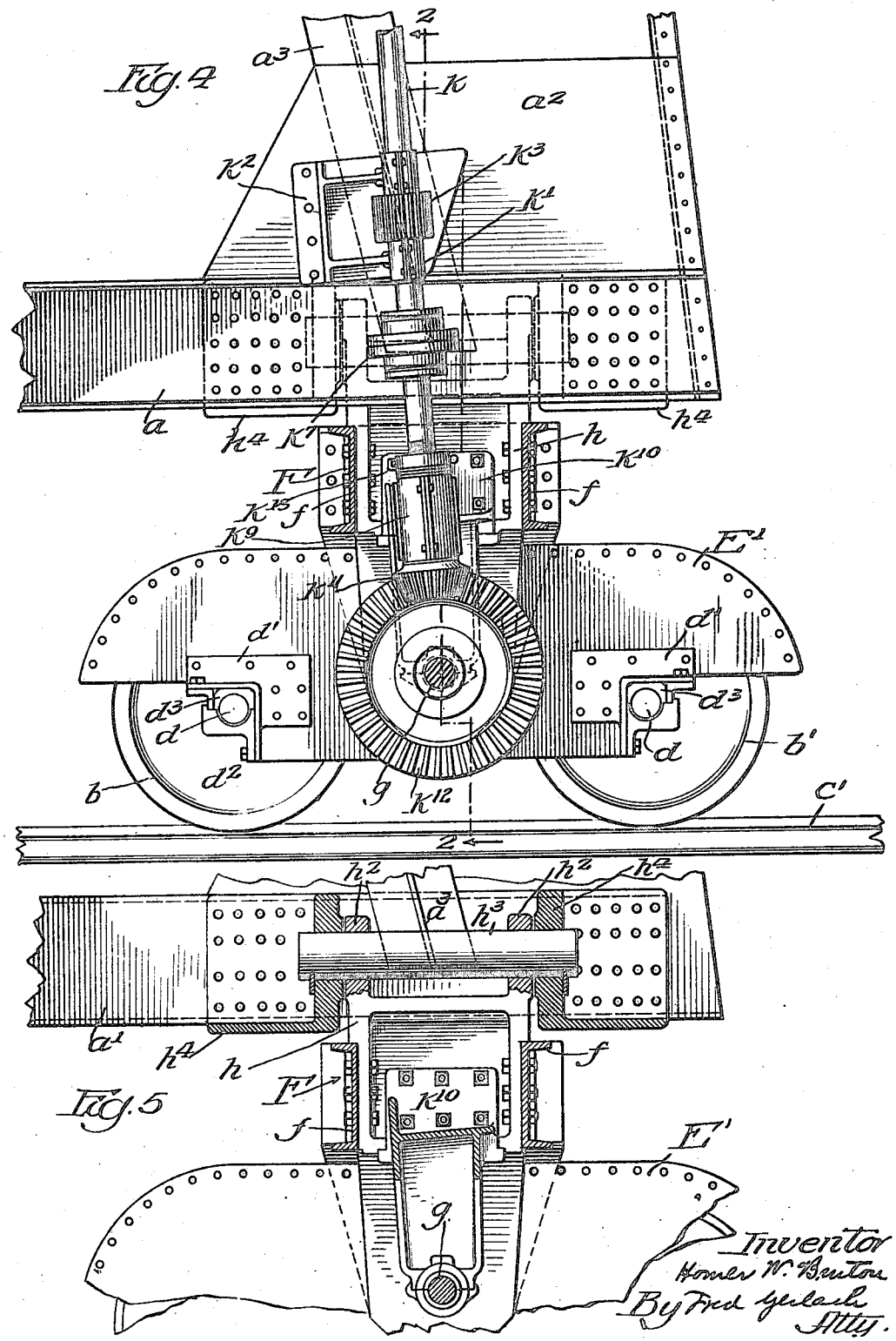

1,708,046

UNITED STATES PATENT OFFICE.

HOMER W. BENTON, OF HARVEY, ILLINOIS, ASSIGNOR TO WHITING CORPORATION, OF HARVEY, ILLINOIS, A CORPORATION OF ILLINOIS.

TRUCK FOR PORTABLE STRUCTURES.

Application filed August 11, 1927. Serial No. 212,209.

The invention relates to trucks for portable structures such as cranes and one object is to provide an improved truck provided with four driven wheels which are connected to the frame of the crane or structure to permit the trucks to conform to all irregularities in the tracks on which the truck wheels run and to maintain uniform or equalized distribution of the load upon all of the wheels.

Another object of the invention is to provide an improved truck of this type in which the wheels at the sides of the truck are mounted in frames which are adapted to tilt independently around the axis of the drive-shaft for the truck wheels.

Another object of the invention is to provide an improved construction of mechanism for driving all four wheels of a truck of this type which dispenses with universal joints in the driving connections.

Other objects of the invention will appear from the description.

The invention consists in the several novel features hereinafter set forth and more particularly defined by claims at the conclusion hereof.

Figure 6:
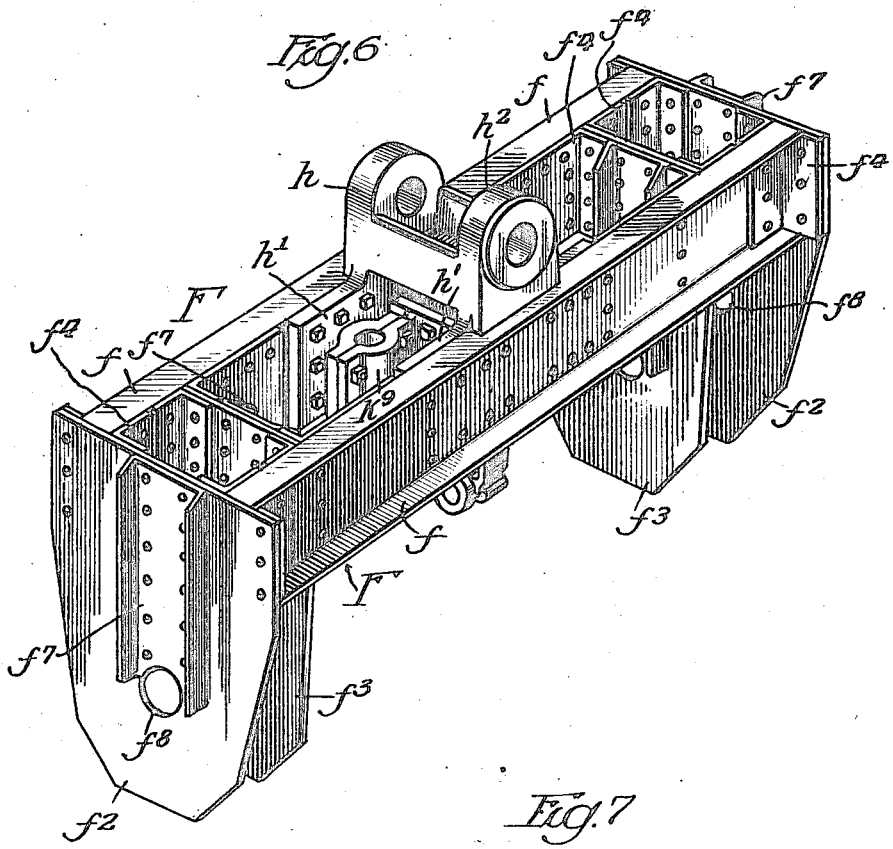
Figure 7:
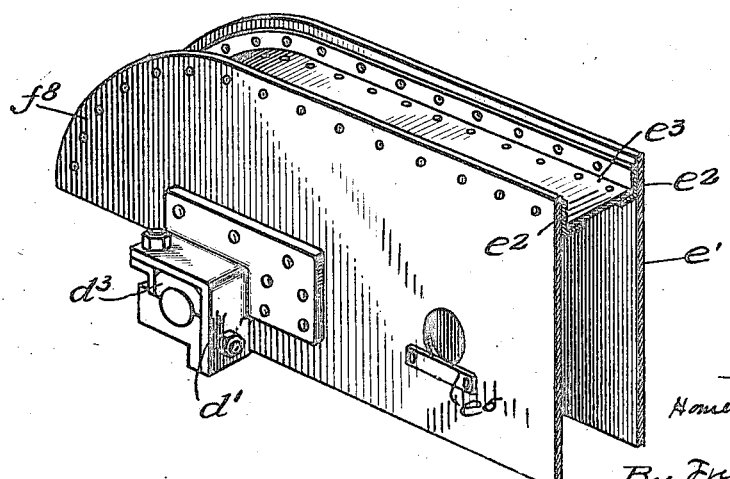

In the drawings: Fig. 1 is a side elevation of a structure embodying the invention. Fig. 2 is a transverse section taken on line 2—2 of Fig. 4. Fig. 3 is a transverse section taken through one pair of transversely aligned truck wheels. Fig. 4 is a longitudinal section on line 4—4 of Fig. 2. Fig. 5 is a longitudinal section on line 5—5 of Fig. 2. Fig. 6 is a detail perspective of the truck-bolster. Fig. 7 is a sectional perspective of one of the side-frames.

The invention is exemplified in a truck for supporting a gauntry crane which comprises a pair of channel beams $a$, $a'$ which form one of the sills of the supporting frame of the crane and are rigidly secured together in spaced relation by plates $a^2$ and supporting legs $a^3$ of the overhead structure of the crane. This exemplifies one of the lower corners of the supporting structure of the crane, each of which is supported by a four-wheeled truck. The construction of the trucks and the driving mechanism therefor are substantially alike, so that only one of them is illustrated and described although it is to be understood that one of them will usually be used at each corner of the structure.

The truck comprises a pair of longitudinally aligned wheels $b$ $b'$ at one side of the truck to run on one rail $c$ and longitudinally aligned wheels $b^2$, $b^3$ at the other side, to run on the other rail $c'$. Each wheel is provided with a flange $c^2$ at its inner sides to retain it on the rails. Each wheel is keyed to an independent axle $d$.

The axles of the longitudinal pair of wheels at one side of the truck are journalled in a side-frame E, and the pair at the other side are journalled in a side-frame E', these frames being separate from each other. Each side-frame is composed of a pair of plates $e$, $e'$ between which the wheels are located, and marginal angle-irons $e^2$, secured to the inner faces of the plates and to a spacer strip $e^3$. Each side-frame forms a housing over and for one longitudinal pair of wheels. The ends of each axle $d$ are journalled in a pair of bearing blocks $d^3$ which are confined in brackets $d$ which are fixed to the plates $e$, $e'$ of one of the side-frames. Each side-frame supports at its longitudinal center a bearing sleeve $e^4$ on which the frame is free to rock vertically. The side-frames are separately pivoted to swing vertically on these sleeves, to permit each side pair of wheels to follow any irregularity in the rail on which those wheels run independently of the other pair, and cause all of the wheels to remain on their rails despite relative irregularities in the track.

A truck bolster F supported over and by the side-frames is made up of a pair of channel-beams $f$ which are spaced apart, a pair of hanger-plates $f^2$, $f^3$ at each end of the bolster, which are secured by angle plates $f^4$ to the ends of said beams; and vertical channel beams $f^7$, fixed to the plates $f^2$, $f^3$, respectively, to form reinforcing and thrust members between the holes $f^8$, in which the sleeves $e^4$ are seated, and the upper ends of said hanger plates. Each bearing sleeve $e^4$ extends between and through the side-plates of one of the side-frames and is fixedly held in place by keys $e^5$ secured to said plates. This exemplifies a bolster which transversely connects the side-frames, and is composed of beams and plates which carry the sleeves $e^4$ on which the side-frames are free to independently swing vertically.

The bolster is pivoted to tilt or rock transversely to permit the wheels at the sides of the truck to independently rise and fall responsively to the relative variation in the rails. The pivotal connection for this purpose comprises a bracket $h$ which fits between beams $f$ and has flanges $h'$ fitting against and bolted to the inner faces of said beams, and integral upwardly extending bearings or ears $h^2$ for a longitudinally extending pivot pin $h^3$ which extends through said ears and into brackets $h^4$ which are fixedly secured to and between the beams $a$, $a'$ of the crane supporting structure. Pin $h^3$ thus permits the bolster and the wheel frames carried thereby to rock transversely for the purpose stated. This exemplifies a truck construction in which longitudinal pairs of wheels are carried by vertically rockable side frames, a bolster for connecting the side-frames and to which the side frames are pivoted, and a connection between the bolster and the supporting structure which permits the bolster and the side frames to rock transversely. As a result, all of the wheels will be free to follow irregularities in each of the rails, as well as relative variation in the height or formation of the rails, so that under all conditions the load will be equalized between the wheels; also a bolster which is composed of wrought beams and parts.

In practice, it is desirable to propel the four wheels of each truck, and for this purpose a transverse shaft $g$ extends through the bearing sleeves $e^4$ around which the side frames are free to rock, so that the rocking of the side frames will be around a point coaxial with said shaft, to maintain the driving relation of the gears for transmitting movement individually to the traction wheels. Gears $g'$ are keyed to the outer ends of shaft $g$ respectively, and each axle $d$ has keyed to its outer end a gear wheel $g^2$ which meshes with one of the gears $g'$. Since the axles $d$, during the rocking of the side frames, move around a point coaxial with the shaft $g$, the driving relation between gears $g'$ and $g^2$ will be maintained. There being a train of gears at each side of the truck, all of the traction wheels will be separately or independently driven from the shaft $g$.

The drive-shaft $g$ is driven from a vertical shaft $k$ which is driven by a motor and gearing on the structure supported by the truck, as well understood in the art. The lower end of shaft $k$ is journalled in a bearing $k'$ carried by a bracket $k^2$ which is fixed to one of the plates $a^2$ of the supporting frame. A pinion $k^3$ is fixed to the shaft $k$ and meshes with a pinion $k^4$ which is fixed to a shaft $k^5$ which is slidably mounted in upper and lower bearings $k^6$ on the bracket $k^2$.

Shaft $k^5$ is connected by means of a flexible coupling $k^7$ to a shaft $k^8$ which is journalled in a bearing $k^9$ carried by a bracket $k^{10}$ which is fixed to the bracket $h$. A bevelled pinion $k^{11}$, keyed to the lower end of shaft $k^8$, meshes with a bevelled gear $k^{12}$ which is keyed to the transverse shaft $g$. Shaft $k^8$ is held against longitudinal movement by pinion $k^{11}$ and an adjustable thrust member $k^{13}$. The flexible coupling $k^7$ permits the shaft $k^8$ to rock with the transverse rockable bolster, and the shaft $k^5$ is slidable in bearings $k^6$, so that it can move responsively to the vertical displacement of the upper member of the flexible coupling. For assembling purposes, shaft $g$ is made up of sections $g^4$ and $g^5$, the abutting ends of which are secured together by a coupling $g^6$. To support the central portion of the shaft $g$, bracket $k^{10}$, which carries the shaft $k^8$, is provided with a hanger or extension $k^{15}$ in the lower end of which bushing members $k^{16}$ are held by a cap $k^{17}$.

This exemplifies driving mechanism for the individually movable traction wheels which comprises a transverse shaft around which the side frames are free to rock to maintain uniform load distribution on the wheels; also one in which the universal joints are dispensed with in the mechanism for driving the wheels from a shaft on the supporting structure to the transverse shaft in the truck.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination with a portable structure, of a truck comprising a pair of separate side-frames, a longitudinally arranged pair of wheels journalled in each of the side-frames to support the sides of the truck respectively, a bolster having its ends supported in, and pivoted to the central portions of, the side-frames, so the latter may swing independently of each other to permit the wheels to rise and fall according to irregularities in the rails, a pivotal connection between the bolster and the structure to permit the bolster and side-frames to tilt transversely, and mechanism for driving all of said wheels.

2. The combination with a portable structure, of a truck comprising a pair of separate side-frames, a longitudinally arranged pair of wheels journalled in each of the side frames to support the sides of the truck respectively, a bolster having sleeves at its ends, on which the central portions of the side frames are pivoted, so the latter may swing independently of each other to permit the wheels to rise and fall according to irregularities in the rails, a pivotal connection between the bolster and the structure to permit the bolster and side-frames to tilt transversely, and mechanism for driving all of said wheels.

3. The combination with a portable structure, of a truck comprising a pair of separate side-frames, a longitudinally arranged pair of wheels journalled in each of the side frames to support the sides of the truck respectively, a bolster having its ends supported in, and pivoted to the central portions of, the side frames, so the latter may swing independently of each other to permit the wheels to rise and fall according to irregularities in the rails, a pivotal connection between the bolster and the structure to permit the bolster and side frames to tilt transversely, and mechanism for driving all of said wheels comprising a transverse shaft and separate gear connections between the ends of the shaft and the wheels respectively.

4. The combination with a portable structure, of a truck comprising a pair of separate side-frames, a longitudinally arranged pair of wheels journalled in each of the side frames to support the sides of the truck respectively, a bolster having sleeves at its ends, on which the central portions of the side-frames are pivoted, so the latter may swing independently of each other to permit the wheels to rise and fall according to irregularities in the rails, a pivotal connection between the bolster and the structure to permit the bolster and side-frames to tilt transversely, and mechanism for driving all of said wheels comprising a shaft in said sleeves.

5. The combination with a portable structure, of a truck comprising a pair of separate side-frames, a longitudinally arranged pair of wheels journalled in each of the side-frames to support the sides of the truck respectively, a bolster having its ends supported by the side-frames so the latter will be free to swing vertically and independently of each other to permit the wheels to rise and fall according to irregularities in the rails, a pivotal connection between the bolster and the structure which permits the bolster and side-frames to tilt transversely, a shaft mounted in the bolster connected to drive both pairs of said wheels, and mechanism for driving said shaft, the side-frames being pivoted to swing vertically around the axis of the shaft.

6. The combination with a portable structure, of a truck comprising a pair of separate side-frames, a longitudinally arranged pair of wheels journalled in each of the side-frames to support the sides of the truck respectively, a bolster having sleeves at its ends on which the central portions of the side-frames are pivoted, so the latter will be free to swing vertically and independently of each other to permit the wheels to rise and fall according to irregularities in the rails, a pivotal connection between the bolster and the structure which permits the bolster and side-frames to tilt transversely, a shaft in the sleeves connected to individually drive all of said wheels, and mechanism for driving said shaft.

7. The combination with a portable structure, of a truck comprising a pair of separate side-frames, a longitudinally arranged pair of wheels journalled in each of the side-frames to support the sides of the truck respectively, a bolster having its ends supported by the side-frames so the latter will be free to swing vertically and independently of each other to permit the wheels to rise and fall according to irregularities in the rails, a pivotal connection between the bolster and the structure which permits the bolster and side-frames to tilt transversely, a shaft mounted in the bolster connected to drive both pairs of said wheels, and mechanism for driving said shaft, comprising a vertical shaft carried by the bolster and bevel gears between the shafts, the side-frames being pivoted to swing vertically around the axis of the shaft.

8. The combination with a portable structure, of a truck comprising a pair of separate side-frames, a longitudinally arranged pair of wheels journalled in each of the side-frames to support the sides of the truck respectively, a bolster having its ends supported by, and pivoted to the central portions of, the side frames so the latter will be free to swing vertically and independently of each other to permit the wheels to rise and fall according to irregularities in the rails, a pivotal connection between the bolster and the structure which permits the bolster and side-frames to tilt transversely, a transverse shaft mounted in the bolster connected to drive both pairs of said wheels, and mechanism for driving said shaft comprising a vertical shaft mounted in the bolster and geared to the transverse shaft, a slidable shaft supported by the structure, and a flexible coupling between the slidable shaft and the vertical shaft.

9. The combination with a portable structure, of a truck comprising a pair of separate side frames, each comprising a pair of spaced plates and having brackets fixed to the plates, a longitudinally arranged pair of wheels journalled in each of the side-frames to support the sides of the truck respectively, each having an axle carried by the brackets, a bolster having sleeves at its ends on which the central portions of the side plates of the frames are pivoted, so the latter will be free to swing vertically and independently of each other to permit the wheels to rise and fall according to irregularities in the rails, a pivotal connection between the bolster and the structure which permits the bolster and side frames to tilt transversely, a shaft mounted in the sleeves and connected to individually drive said wheels, and mechanism for driving said shaft.

10. The combination with a portable structure, of a truck comprising a pair of separate side frames, a longitudinally arranged pair of wheels journalled in each of the side frames to support the sides of the truck respectively, a bolster having its ends supported by, and pivoted to the central portions of, the side frames so the latter will be free to swing vertically and independently of each other to permit the wheels to rise and fall according to irregularities in the rails, a pivotal connection between the bolster and the structure which permits the bolster and sideframes to tilt transversely, the bolster being composed of transverse beams and a pair of hanger plates at each end, reinforcing members for the plates, and a transverse shaft mounted in the bolster and connected to drive said wheels.

11. The combination with a portable structure, of a truck comprising a pair of separate side frames, a longitudinally arranged pair of wheels journalled in each of the side frames to support the sides of the truck respectively, a bolster having a sleeve at its ends on which the central portions of the side frames are pivoted, so the latter will be free to swing vertically and independently of each other to permit the wheels to rise and fall according to irregularities in the rails, a pivotal connection between the bolster and the structure which permits the bolster and side frames to tilt transversely, the bolster being composed of transverse beams and a pair of hanger plates at each end, reinforcing members for the plates above the sleeves, and a transverse shaft mounted in the sleeves and connected to drive said wheels.

Signed at Harvey, Ill., this 8th day of August, 1927.

HOMER W. BENTON.